E. H. BRISTOL.
MEASURING OR CONTROLLING INSTRUMENT.
APPLICATION FILED JAN. 26, 1912.
1,195,334. Patented Aug. 22, 1916.
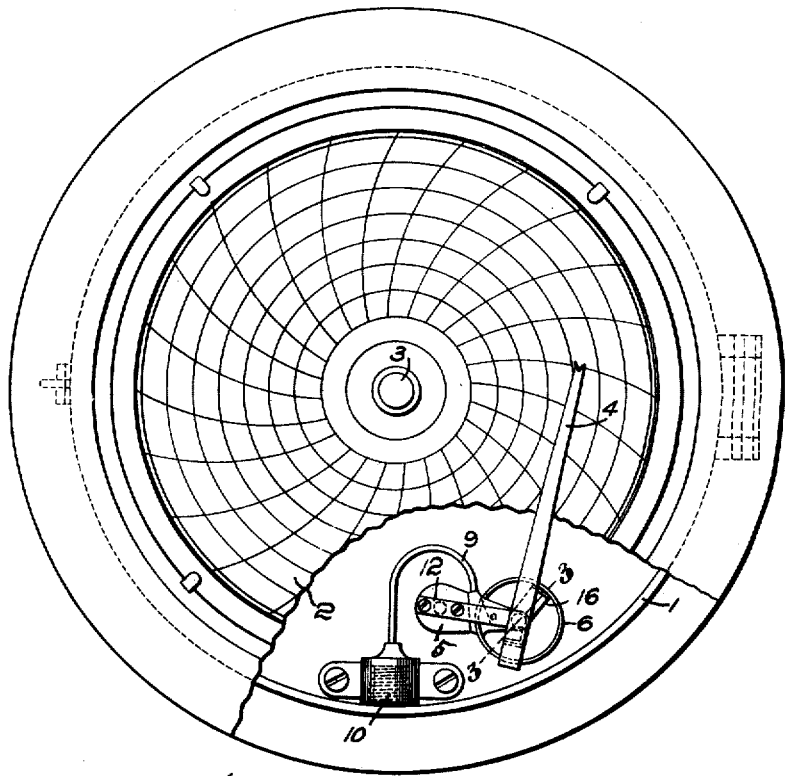
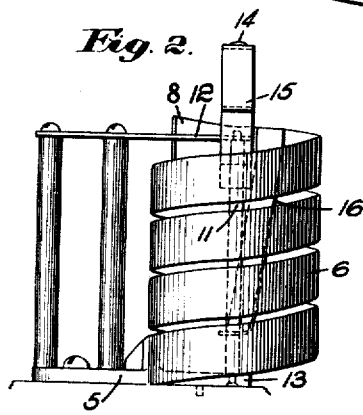
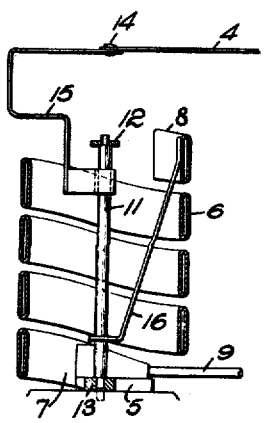
Witnesses:
Horace A. Crossman
Carl L. Choate
Inventor:
Edgar H. Bristol.
by Emery, Booth, Janney & Varney
Attys ed in the casing 1 upon
UNITED STATES PATENT OFFICE.

EDGAR H. BRISTOL, OF FOXBORO, MASSACHUSETTS, ASSIGNOR TO THE INDUSTRIAL INSTRUMENT COMPANY, OF FOXBORO, MASSACHUSETTS, A CORPORATION OF CONNECTICUT.

MEASURING OR CONTROLLING INSTRUMENT.

1,195,334.  Specification of Letters Patent.  Patented Aug. 22, 1916.

Application filed January 26, 1912. Serial No. 673,525.

*To all whom it may concern:*

Be it known that I, EDGAR H. BRISTOL, a citizen of the United States, and a resident of Foxboro, in the county of Norfolk and State of Massachusetts, have invented an Improvement in Measuring or Controlling Instruments, of which the following description, in connection with the accompanying drawings, is a specification, like characters on the drawings representing like parts.

This invention relates to that class of instruments where an element responsive to changes in temperature, pressure, or the like, is used to perform some desired indicating, recording, or other office.

To illustrate one practical mode of utilizing the features of the invention the same will be described herein as embodied in a pressure responsive instrument.

It is to be understood that the invention is not limited to the specific construction and organization illustrated in the drawings nor to the specific operation and use described herein for exemplification.

The invention will be best understood by reference to the following description when taken in connection with the accompanying illustration of one specific embodiment thereof while its scope will be more particularly pointed out in the appended claims.

In the drawings: Figure 1 shows in front elevation an instrument embodying my invention, suitably incased, parts of the case being broken away to disclose its interior. Fig. 2 is a detailed plan of the recording mechanism at an enlarged scale. Fig. 3 is a sectional view at an enlarged scale on line 3—3 of Fig. 1.

Referring to the drawings and to the embodiment of my invention which I have there shown for illustrative purposes, I have there shown an instrument having a casing 1 of any usual construction within which there is mounted a suitably graduated chart 2 carried by a spindle 3 which it will be understood is rotated by suitable means such as the time train of a clock-movement (not shown), angular movement of the chart representing periods of time. An index or pointer, in the illustrative embodiment, a pen index 4, suitably mounted and driven as presently described, may be arranged to travel in a generally radial direction over the chart 2 in order to indicate or record thereon, a pressure prevailing at or during any instant or period of time.

For the purposes of the specific instrument there is mounted in the casing 1 upon a suitable support 5 a pressure responsive element, exemplified by a helically coiled capillary tube 6 having a fixed end 7 mounted upon said support and a sealed end 8. Herein this tube is of flattened cross-sectional shape and is connected by a small capillary tube 9 to a connection 10. To the latter there will be connected the usual pipe not shown leading to the source of pressure. It will be understood that the fluctuations of pressure within the helically coiled tube 6 will tend to unwind the same and thereby produce in the tube a rotatory tendency about the axis of the helix of the tube.

Located in a substantially central position within the coil of the tube and substantially coaxial with the helix of the latter is a working device preferably comprising shaft 11 journaled at its opposite ends in bearings formed by arms 12 and 13 secured to or forming a part of support 5. Herein the shaft is shouldered at its ends where it enters its bearings so as to be held against longitudinal displacement therein. To this shaft the index 4 is secured in an adjustable manner by a pivotal joint 14 carried by the arm 15 rigidly secured to the shaft. Herein this joint is coaxial with the shaft 12 so as to permit a radial adjustment of the hand without affecting the arc which it traces.

The shaft 11 is connected to the movable portion of the helically coiled tube 6 adjacent to the sealed end of the latter by a suitable radially extensible but preferably circumferentially rigid driving connection herein consisting of a flat strip 16 having the greater dimension of its cross-section tangentially disposed. Herein this strip is fixed at one end to the shaft and at its other end to the tube 6 in any suitable manner as by soldering, and extends obliquely to the shaft. By this construction the connection is rendered radially flexible but circumferentially rigid so as to permit the shaft to be positively rotated by the tube without loss of motion and yet permitting the coils of the tube to expand radially as it must be evident that they tend so to do. The advantage of placing the shaft centrally within the coils of the tube and connecting it to the latter in the manner described is that the shaft has a very stable center and any possibility of unduly straining and injuring the tube is avoided. By reason of this construction also undue strain on the bearings is prevented. Moreover this construction provides for the use of two bearings for the shaft and the bearings may be placed at a great distance apart. Furthermore the use of two bearings gives a positive center of motion, and avoids all strains on the tube except the circumferential stress which is utilized in measuring the pressure.

While a pressure responsive instrument has been described hereinbefore for purposes of illustration, the invention is not essentially limited thereto. On the contrary, except where otherwise indicated by the context of the claims, the invention is to be considered applicable to any uses to which it may be practicably applied. Also the specific construction and organization disclosed for illustration may be variously changed and modified, as will appear to those skilled in the art.

For convenience, in some of the sub-joined claims, the expression "working device" will be used to designate a governed or actuated element of the instrument, such for example as is exemplified by the shaft 11, or index 4.

While I have herein shown and described one form of my invention for illustrative purposes, and have disclosed and discussed in detail the construction and arrangement incidental to one specific application thereof, it is to be understood that the invention is limited neither to the mere details or relative arrangement of parts nor to its specific application herein shown, but that extensive deviations from the illustrated form or embodiment of the invention may be made without departing from the principles thereof.

Having thus described my invention, what I claim is:

1. An instrument of the class described having, in combination, a coiled responsive element having one end fixed and the other end movable, a shaft disposed in a substantially central position within the coil of said element, a radially flexible but circumferentially rigid connection secured at one end to said shaft and at its other end to the movable portion of the responsive element, and an index carried by said shaft.

2. An instrument of the class described having, in combination, a helical responsive element fixed at one end and having its other end movable, a shaft coaxially disposed within the helix of said element, a radially flexible but circumferentially rigid connection secured at one end to said shaft, extending obliquely thereto and fixed at its other end to the movable portion of said element, and an index carried by said shaft.

3. An instrument of the class described having, in combination, a helical responsive element fixed at one end and having its other end movable, a shaft coaxially disposed within the helix of said element, a radially flexible but circumferentially rigid connection consisting of a flat strip having the greater dimension of its cross-section tangentially disposed, one end of said strip being secured to said shaft, and the other to the movable portion of said element, and an index carried by said shaft.

4. An instrument of the class described having, in combination, a coiled responsive element having one end fixed and the other end movable, a shaft disposed in a substantially central position within the coil of said element, a radially flexible but circumferentially rigid connection secured at one end to said shaft and at its other end to the movable portion of said element, an index carried by said shaft, a support outside the coil or coils of said element for the fixed end of said element, and arms extending laterally from said support and provided with bearings for opposite ends of the shaft.

5. An instrument of the class described having, in combination, a coiled responsive element having one end fixed and the other end movable, a shaft disposed in a substantially central position within the coil of said element, a circumferentially rigid driving connection between said shaft and the movable portion of said element, said connection having provision automatically to yield radially during the operation of the instrument, and an index carried by said shaft.

6. In an instrument of the class described, the combination of a responsive member arranged to have responsive movement in a curvilinear path and having a capacity for movement in another direction, a working device, and a connection for driving the working device by said responsive member, including transmission means having capacity for automatic enlargement and contraction under the influence of said responsive member in a radial direction substantially normal to said curvilinear path during the operation of the instrument.

7. In an instrument of the class described, the combination of responsive means arranged to have responsive movement in a curvilinear path, a working device, means for supporting said working device independently of said responsive means, and a connection for driving the working device by said responsive means, including transmission means having capacity for automatic enlargement and contraction under the influence of said responsive means during the operation of the instrument in a direction substantially normal to said curvilinear path, and inextensible in the direction of said path.

In testimony whereof, I have signed my name to this specification, in the presence of two subscribing witnesses.

EDGAR H. BRISTOL.

Witnesses:
BENNET B. BRISTOL,
BERTHA M. STEARNS.

enlargement and contraction under the influence of said responsive means during the operation of the instrument in a direction substantially normal to said curvilinear path, and inextensible in the direction of said path.

In testimony whereof, I have signed my name to this specification, in the presence of two subscribing witnesses.

EDGAR H. BRISTOL.

Witnesses:
BENNET B. BRISTOL,
BERTHA M. STEARNS.

---

Correction in Letters Patent No. 1,195,334.

It is hereby certified that Letters Patent No. 1,195,334, granted August 22, 1916, upon the application of Edgar H. Bristol, of Foxboro, Massachusetts, for an improvement in "Measuring or Controlling Instruments," were erroneously issued to The Industrial Instrument Company, of Foxboro, Massachusetts, a corporation of Connecticut, whereas said Letters Patent should have been issued to *The Foxboro Company, of Foxboro, Massachusetts, a corporation of Massachusetts*, as shown by the record of assignment in this office; and that the said Letters Patent should be read with this correction therein that the same may conform to the record of the case in the Patent Office.

Signed and sealed this 3d day of October, A. D., 1916.

[SEAL.]

F. W. H. CLAY,
*Acting Commissioner of Patents.*

It is hereby certified that Letters Patent No. 1,195,334, granted August 22, 1916, upon the application of Edgar H. Bristol, of Foxboro, Massachusetts, for an improvement in "Measuring or Controlling Instruments," were erroneously issued to The Industrial Instrument Company, of Foxboro, Massachusetts, a corporation of Connecticut, whereas said Letters Patent should have been issued to *The Foxboro Company, of Foxboro, Massachusetts, a corporation of Massachusetts*, as shown by the record of assignment in this office; and that the said Letters Patent should be read with this correction therein that the same may conform to the record of the case in the Patent Office.

Signed and sealed this 3d day of October, A. D., 1916.

[SEAL.]

F. W. H. CLAY,
*Acting Commissioner of Patents.*